UNITED STATES PATENT OFFICE.

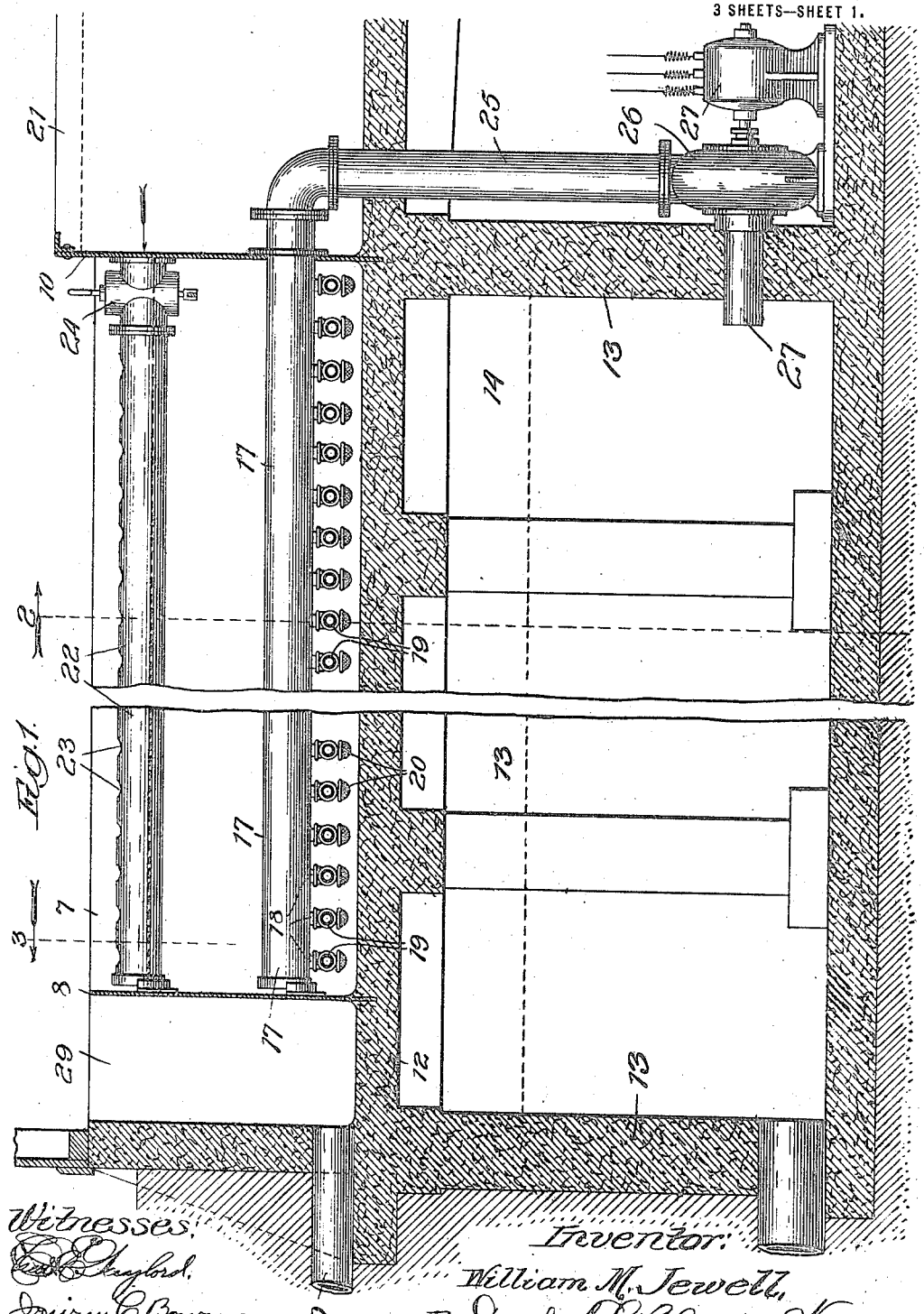

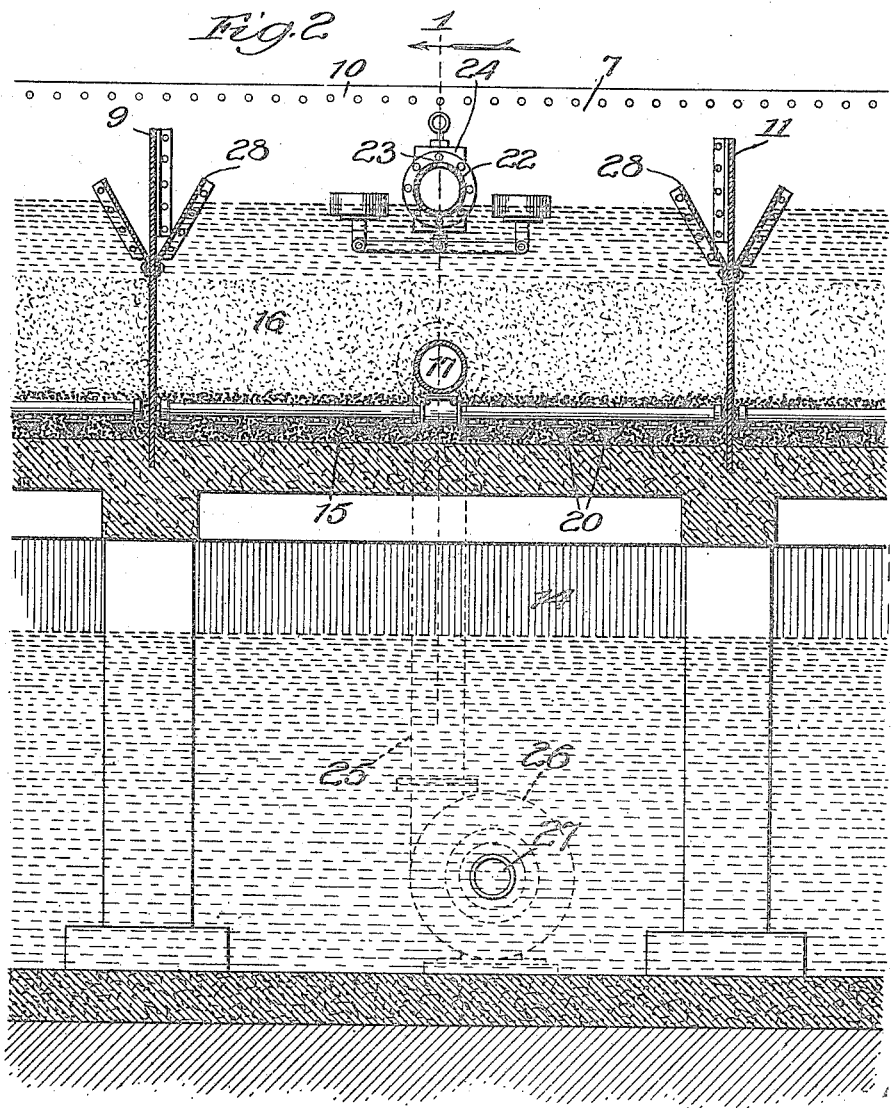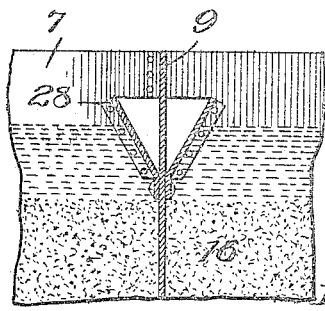

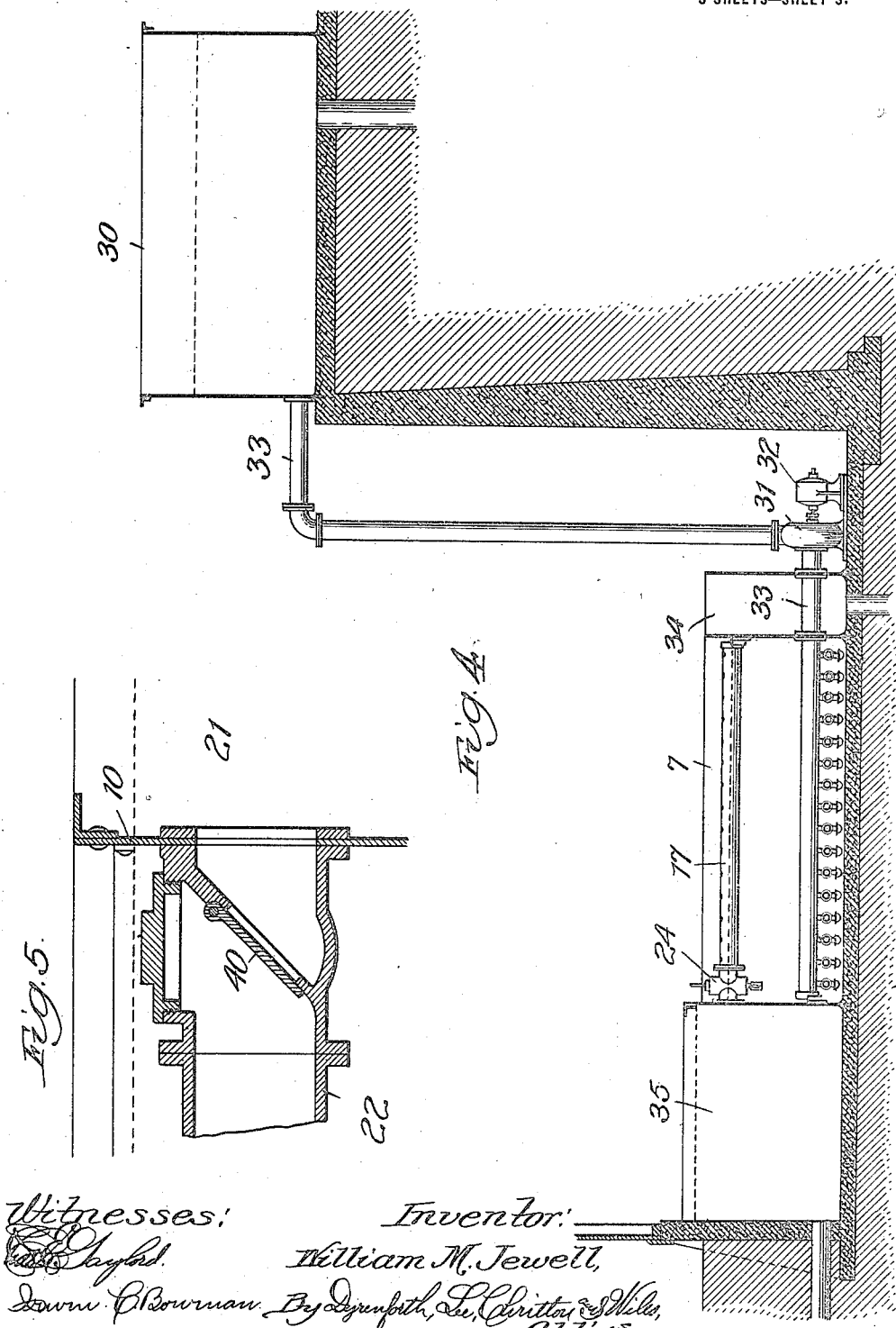

WILLIAM M. JEWELL, OF CHICAGO, ILLINOIS, ASSIGNOR TO JEWELL ENGINEERING COMPANY, OF CHICAGO, ILLINOIS, A CORPORATION OF ILLINOIS.

ART OF FILTRATION.

1,248,127.      Specification of Letters Patent.      Patented Nov. 27, 1917.

Application filed May 12, 1913. Serial No. 767,150.

*To all whom it may concern:*

Be it known that I, WILLIAM M. JEWELL, a citizen of the United States, residing at Chicago, in the county of Cook and State of Illinois, have invented a new and useful Improvement in the Art of Filtration, of which the following is a specification.

My invention relates to improvement in the method of filtering liquid, and more particularly water, for purifying it, and cleansing the filter bed by a reversal of flow therethrough; my primary objects being to provide a method of filtration whereby filtering apparatus of relatively inexpensive construction and operable at relatively small cost, especially for labor, may be employed, and the undue waste of water and loss of time in operating the plant may be prevented.

Referring to the accompanying drawings, wherein I have illustrated certain apparatus which may be used for practising my improved method, though not to the exclusion of any other suitable apparatus—

Figure 1 is a longitudinal sectional view in elevation of the apparatus, a portion thereof being broken away. Fig. 2 is a section taken at the line 2 on Fig. 1 and viewed in the direction of the arrow. Fig. 3 is a section taken at the line 3 on Fig. 1 and viewed in the direction of the arrow. Fig. 4 is a view similar to Fig. 1 of a modification of the apparatus; and Fig. 5, a broken view in longitudinal vertical sectional elevation of a modification of the valve for controlling the flow of water into the filter.

While my improved method has utility within a wide range, it presents special advantages where filtering is to be performed on a large scale, as for example, to purify the water-supply of a city, and in fact presents its greatest advantages when used in connection with such large installations, and while I have illustrated my invention in connection with a single filtering chamber, it will be readily understood that it has equal applicability where it is desired to provide any number of filtering units, the one unit shown being, however, sufficient to illustrate my improved method.

Referring particularly to the apparatus illustrated in Figs. 1, 2, 3, and 4, the filtering chamber is represented at 7, and is formed of the walls 8, 9, 10 and 11, preferably of steel and embedded in a concrete floor-section 12, which latter is supported from walls 13, forming a chamber 14 for receiving the filtered water discharged from the filter, as hereinafter described.

The type of filter illustrated is commonly known as the gravity type, the filter-bed of which is preferably formed of a layer of coarse gravel 15 on which is superposed a layer 16 of sand of the desired depth, through which sand and gravel, the water to be filtered, percolates for the separation therefrom of its contained impurities, the water thus filtered thence flowing from the filter to the point of storage or use. In the apparatus illustrated the chamber 7 contains a pipe 17 extending lengthwise thereof and provided at intervals with depending nipples 18 which open into branch-pipes 19 each provided at intervals along its under side with perforated heads 20, these pipes being preferably so arranged that the heads 20 and pipes 19 will be buried in the coarse gravel 15.

In the arrangement illustrated a tank 21 adjoins the filter-chamber 7, this tank being provided for the purpose of mixing with the water to be filtered a coagulating substance, as is commonly done in water filters, though the practising of my improved method is in no wise dependent upon the use of a coagulating tank. The tank 21 opens into a pipe 22 which extends lengthwise of the filter-chamber 7 and is provided with outlets 23 at intervals along its upper side, whereby the filter-chamber 7 is charged with water to be filtered from the tank 21. In the arrangement illustrated, the water is maintained in the tank 21 at a level considerably above the level to be maintained in the filter 7, and to provide for the maintenance of the level of the water in the filter at the desired height, the pipe 22 is equipped with an automatically operating valve represented at 24, that shown being a standard balanced double-disk float valve.

The pipe 17 opens into a pipe 25 which latter opens into the casing of a pump indicated at 26, the suction end of the pump in the particular arrangement shown in Figs. 1, 2, 3, and 4, opening into a pipe 27, which extends into and communicates with the interior of the filtered-water chamber 14. Any suitable fluid-moving mechanism and operating means therefor may be employed, that illustrated representing diagrammatically a centrifugal pump driven by an electric motor indicated at 27.

In the operation of the apparatus illustrated, water constantly flows from the tank 21 through the pipe 22 into the filter-chamber 7 to maintain the water level therein indicated in Fig. 2, the water in the chamber 7 percolating by gravity through the filter-bed formed of the gravel 15 and sand 16, from which it flows in purified condition into the heads 20 and pipes 19 and thence into the pipe 17 from which it discharges by gravity through the pump 26 (the pump in this operation being idle), and thence through the pipe 27 into the filtered water chamber 14. The filtering action just described is permitted to continue until the impurities removed from the water by the filter have accumulated in the latter to such a degree that cleansing of the filter-bed is desirable, whereupon the pump 26 is started, by the operator, or by any desirable automatic mechanism, not shown, to produce a counterflow of filtered water through the pipes 27, 25 and 17, together with the water-collecting branches of the last referred to pipe, which causes wash-water to flow upwardly through the gravel and sand bed with a velocity, as is well understood in the art, sufficient to separate the grains of sand in order that they may be washed free of the deposits thereon. The wash-water thus introduced into the filter is conducted away from the latter by overflowing into troughs 28 at a level above the unfiltered water level maintained in the filter-chamber 7 during the filtering operation by the action of the valve 24, the said troughs opening into a channel 29 having an outlet 30 forming a drain which may, if desired, lead to a sewer, it being understood that as the valve 24 serves to permit water to enter the chamber 7 from the chamber 21, only when the water level in the chamber 7 drops below that indicated in Fig. 2, this valve will automatically close and remain closed during the operation of washing the filter as described, thus shutting off the supply of raw water to the filter and preventing the wash-water from being forced into the raw water tank 21.

It will be understood from the foregoing that the operation of the pump 26 for causing a current of water to flow from the filtered water supply into the collecting pipes of the filter in a direction reverse to that taken by the filtered water in flowing from the filter into the tank 14 automatically, so to speak, not only causes filtration to be discontinued, but also operates to shut off the supply of unfiltered water to the filter-chamber 7.

In the apparatus illustrated in Fig. 4, the filtered water reservoir instead of being located below the filter, is located above it, as represented at 30, and thus the pump represented at 31 and driven from a motor as at 32 will operate during the filtering operation to force the filtered water from the filter through the pipes 33 into the filtered water tank 30, the counterflow of filtered water for washing out the filter-bed being effected by merely stopping the pump 31, which thus allows the water to flow from the tank 30 through the pipes 33 past the pump 31 into the water-collecting pipes of the filter, the water thus supplied to the filter washing upwardly through the filter-bed and finally discharging into a channel 34 (like the channel 29), through troughs, not shown, but arranged above the water level maintained in the filter-chamber.

It will be understood that in the construction just described when the pump 31 is stopped reversal of flow through the pipes 33, due to the head of water in the tank 30, will not only cause filtered water for washing purposes to be introduced into the filter, but will operate automatically, so to speak, to arrest the filtering operation and prevent the flow of unfiltered water into the filter from the tank 35 which corresponds with the tank 21.

In carrying out my improved method it is not necessary that the filtering chamber and filtered water-chamber be arranged at different levels, for under some conditions they may be arranged at the same level and any suitable water-driving mechanism may be employed for forcing the water in one direction during the filtering operation and in the opposite direction for wash-out purposes instead of utilizing gravity for effecting the flow in one direction as explained of the apparatus illustrated.

Furthermore, it will be manifest that any other apparatus suitable for carrying out my improved method may be employed and that the apparatus as shown may, in modified and altered condition, be used to carry out my improved method, and as an example of one of the many alterations and modifications which might be made, I have illustrated in Fig. 5 a different form of valve for controlling the flow of raw-water into the filter-chamber from the source thereof, the valve in this case instead of being a float-controlled valve, being in the form of a swinging check-valve, which is interposed in the pipe 22 and is represented at 40. When such a valve is used the water in the tank 21 constituting the raw-water supply should be kept at a level below that at which the wash-water overflows into the troughs in the filter-chamber, thus preventing the raw-water from overflowing into the troughs, and insuring the closing of the valve 40 during the passage of the wash-water through the filter in the wash-out operation.

What I claim as new and desire to secure by Letters Patent is:

1. The method of water filtration and filter cleansing, which consists in passing water to be filtered through the filter, in one direction for filtering it, and cleansing the filter and initially arresting the flow of filtered water from the filter solely by causing water to flow in a reverse direction through the filter.

2. The method of water filtration and filter cleansing which consists in filtering water and discharging it in one direction and in reversing the water for the cleansing purpose to flow it in the opposite direction wholly through the same path through which it was discharged.

3. The method of water filtration and cleansing the filtration means which consists in filtering the water by percolation through a granular filter-bed and conducting the filtered water from the filter through a conduit and washing the filter-bed and simultaneously initially arresting the flow of unfiltered water to the filter by reversing the flow of filtered water wholly through the same conduit through which it was discharged.

4. The method of water filtration and cleansing the filtration means which consists in filtering the water by percolation through a granular filter-bed and conducting the filtered water from the filter through a conduit and washing the filter-bed and simultaneously initially arresting the flow of filtered water from the filter by reversing the flow of filtered water wholly through the same conduit through which it was discharged.

5. The method of water filtration and cleansing the filtration means which consists in filtering the water by percolation through a granular filter-bed and conducting the filtered water from the filter through a conduit and washing the filter-bed and simultaneously initially arresting the flow of unfiltered water to the filter and the flow of filtered water from the filter-bed solely by reversing the flow of water through said conduit.

6. The method of water filtration and cleansing the filtration means which consists in filtering the water by percolation through a granular filter-bed and conducting the filtered water from the filter through an unobstructed course, and reversing the flow of filtered water wholly through the same path to wash the filter.

WILLIAM M. JEWELL.

In presence of—
D. C. Thorsen,
O. C. Avisus.

Copies of this patent may be obtained for five cents each, by addressing the "Commissioner of Patents, Washington, D. C."